128,578

UNITED STATES PATENT OFFICE.

WILLIAM SMITH AMIES, OF GUERNSEY, GREAT BRITAIN.

IMPROVEMENT IN ARTIFICIAL MANURES.

Specification forming part of Letters Patent No. 128,578, dated July 2, 1872.

Specification describing a certain compound called Artificial Manures, invented by WILLIAM SMITH AMIES, of Guernsey, one of the British Channel Islands.

The nature of the invention of the said AMIES consists in mixing carbon and sulphate of iron, to form a new manure or manures, in the following manner:

In carrying out my invention I employ the carbon in the shape of stonecoal, vegetable charcoal, or animal charcoal, and I use the manure in a liquid or solid state. I have found that the following proportions are suitable for gardening and agricultural purposes: No. 1 consisting of one part of carbon and one part of sulphate of iron; No. 2 consisting of two parts of carbon and one part of sulphate of iron; No. 3 consisting of three parts of carbon and one part of sulphate of iron; No. 4 consisting of four parts of carbon and one part of sulphate of iron; No. 5 consisting of five parts of carbon and one part of sulphate of iron.

The ingredients which compose my manure are pulverized as small as possible by any suitable and well-known method and apparatus. They are then mixed and blended intimately together, this being a material part of my invention, the manure being the more efficient the more intimately the mixing is done; or the sulphate of iron may be used in a liquid dissolved state, and, after the pulverized carbon has been mixed in with it, the mixture may be dried and pulverized again; or the manure may be applied in the liquid state.

Manure produced as above described may in some cases be mixed with a small proportion of sand, earth, or ashes, or other substances, if it be desired.

I do not limit myself to the proportions above given.

I claim—

The manufacture of manure or manures, consisting of carbon and sulphate of iron, substantially as hereinbefore described and set forth.

WM. STH. AMIES.

Witnesses:
   J. B. WYNN,
      24 Royal Exchange, London.
   EDWD. GRIFFITH BREWER,
      89 Chancery Lane.